US009750188B2

(12) United States Patent
Takeda et al.

(10) Patent No.: US 9,750,188 B2
(45) Date of Patent: Sep. 5, 2017

(54) BERRY CATCHER SYSTEM

(71) Applicant: The United States of America, as represented by the Secretary of Agriculture, Washington, DC (US)

(72) Inventors: Fumiomi Takeda, Martinsburg, WV (US); Scott D. Wolford, Martinsburg, WV (US)

(73) Assignee: The United States of America, as represented by The Secretary of Agriculture, Washington, DC (US)

( * ) Notice: Subject to any disclaimer, the term of this patent is extended or adjusted under 35 U.S.C. 154(b) by 10 days.

(21) Appl. No.: 14/823,277

(22) Filed: Aug. 11, 2015

(65) Prior Publication Data

US 2017/0042092 A1    Feb. 16, 2017

(51) Int. Cl.
*A01D 46/22* (2006.01)
*A01D 46/28* (2006.01)
*A01D 46/26* (2006.01)

(52) U.S. Cl.
CPC ...... *A01D 46/264* (2013.01); *A01D 2046/262* (2013.01)

(58) Field of Classification Search
CPC ...... A01D 46/22; A01D 46/26; A01D 46/264; A01D 46/28; A01D 46/005; A01D 2046/262; A01D 2046/266; A01D 2046/268
USPC ............... 484/26–29, 77, 121; 182/138, 139
See application file for complete search history.

(56) References Cited

U.S. PATENT DOCUMENTS

| | | | | |
|---|---|---|---|---|
| 312,683 A * | 2/1885 | Wettstein | ............ | A63B 21/023 182/139 |
| 503,572 A * | 8/1893 | Beal | ............ | A63B 21/023 182/139 |
| 544,125 A * | 8/1895 | Sapp | ............ | G10D 13/023 182/139 |
| 1,296,359 A * | 3/1919 | Brown | ............ | A63D 5/00 114/219 |
| 1,738,411 A * | 12/1929 | Welch | ............ | A47C 27/081 482/27 |
| 2,975,855 A * | 3/1961 | Dudek | ............ | A62B 1/22 182/137 |
| 3,114,998 A * | 12/1963 | Weisser | ............ | A01D 46/005 56/329 |
| 3,276,194 A * | 10/1966 | Mohn | ............ | A01D 46/005 56/330 |
| 3,531,925 A * | 10/1970 | Vines | ............ | A01D 46/26 56/329 |
| 3,543,486 A * | 12/1970 | Bull | ............ | A01D 46/26 56/1 |
| 3,656,282 A * | 4/1972 | Rauth | ............ | A01D 46/005 56/1 |

(Continued)

FOREIGN PATENT DOCUMENTS

GB       2273246 A *  6/1994    ............ A63B 5/11

*Primary Examiner* — Thomas B Will
*Assistant Examiner* — Joan D Misa
(74) *Attorney, Agent, or Firm* — John D. Fado; Robert D. Jones

(57) ABSTRACT

The berry catcher system has an elastic catcher sheet that is sandwiched between upper and lower endless hollow rims. A protector sheet is deployed below the catcher sheet. The system is structured so that as berries are dislodged from their respective vines, the catcher sheet catches the berries as the protector sheet simultaneously protects (at least) the underside of the catcher sheet.

11 Claims, 2 Drawing Sheets

(56) References Cited

U.S. PATENT DOCUMENTS

| | | | | |
|---|---|---|---|---|
| 3,979,891 A * | 9/1976 | Patton | A01D 46/005 | 56/328.1 |
| 4,291,526 A * | 9/1981 | Hiyama | A01D 46/28 | 56/330 |
| 4,464,888 A * | 8/1984 | Burton | A01D 46/28 | 56/330 |
| 4,576,375 A * | 3/1986 | Roberts | A63B 5/11 | 472/129 |
| 4,580,397 A * | 4/1986 | Sarig | A01D 46/28 | 56/328.1 |
| 5,074,107 A * | 12/1991 | Windemuller | A01D 46/28 | 56/12.8 |
| 5,109,657 A * | 5/1992 | DeVries | A01D 46/28 | 56/330 |
| 5,181,373 A * | 1/1993 | Littau | A01D 46/28 | 56/329 |
| 5,341,630 A * | 8/1994 | Littau | A01D 46/28 | 56/330 |
| 5,472,390 A * | 12/1995 | Faye | A63B 23/0458 | 482/27 |
| 5,495,708 A * | 3/1996 | Scott | A01D 46/28 | 56/329 |
| 5,647,194 A * | 7/1997 | Scott | A01D 46/28 | 56/328.1 |
| 5,816,037 A * | 10/1998 | Chiel | A01D 46/26 | 56/328.1 |
| 5,853,352 A * | 12/1998 | Login | A63B 6/00 | 482/23 |
| 6,071,213 A * | 6/2000 | Raasch | A63B 5/11 | 220/9.4 |
| 6,421,995 B1 * | 7/2002 | Sancho | A01D 46/26 | 56/330 |
| 6,442,920 B1 * | 9/2002 | Peterson | A01D 46/26 | 56/328.1 |
| 6,846,271 B2 * | 1/2005 | Publicover | A63B 5/11 | 182/139 |
| 7,650,740 B2 * | 1/2010 | Pellenc | A01D 46/28 | 56/329 |
| 2013/0269307 A1 * | 10/2013 | Pellenc | A01D 46/28 | 56/329 |
| 2016/0144214 A1 * | 5/2016 | Leslie | A63B 6/00 | 482/26 |

* cited by examiner

BERRY CATCHER SYSTEM

FIELD OF THE INVENTION

The disclosed method and apparatus relates to a new design for berry catchers on over-the-row berry pickers. Specifically, the system described herein relates to a method and apparatus for catching harvested blueberries so that bruising to the blueberries is minimized.

BACKGROUND OF THE INVENTION

The blueberry industry has grown four fold in the past three decades and is an important source of economic growth in rural communities. The current mechanized system for harvesting blueberries utilizes rotating bars that beat the blueberry bushes to dislodge the blueberries. Once the berries are dislodged, they are caught on hard plastic catcher plates that direct the berries onto a conveyor belt, which transfers the fruit into a box.

Prior art designs have included various amounts of catcher plate padding to attempt to minimize berry bruising. However, the padding increased the thickness and weight of the plates and the padded plates still caused an unacceptable amount of bruising. The padding also frequently tore—which not only resulted in bruised fruit but also interfered with the flow of the fruit to the harvester conveyor belt.

The need exists for a more efficient and less damaging way to catch the blueberries as they fall from the bush so that bruising is minimized, and the size and weight of the blueberry catcher plates are also minimized. The catcher plates described herein comprise a frame with a (preferably) neoprene rubber catcher sheet stretched between the frame components, as well as a protective sheet positioned on the bottom of the frame. The protective sheet further supports the catcher sheet and prevents damage to the catcher sheet from debris on the ground. The inventors' catcher plates decrease bruising and simultaneously reduce the weight and bulk of the catcher plates while not interfering with the smooth flow of the berries across the plates and onto the conveyor belt.

SUMMARY OF THE INVENTION

This disclosure is directed to a berry catcher system. The system includes an endless hollow upper rim and an endless hollow lower rim. A catcher sheet stretched across (and sandwiched by) the upper and lower rims. A protector sheet is stretched across the lower rim. The system is structured so that as a harvester moves across a field, falling berries are caught by the catcher sheet as the protector sheet simultaneously protects the underside of the catcher sheet.

This disclosure is also directed to a method of making a berry catcher system. In accordance with the method, hollow upper and lower rims are provided and a catcher sheet is stretched across (and sandwiched by) the upper and lower rims. A protector sheet is stretched across the lower rim. The system is structured so that as a harvester moves across a field, falling berries are caught by the catcher sheet as the protector sheet simultaneously protects the underside of the catcher sheet.

DETAILED DESCRIPTION OF PREFERRED EMBODIMENTS

Figure 1:
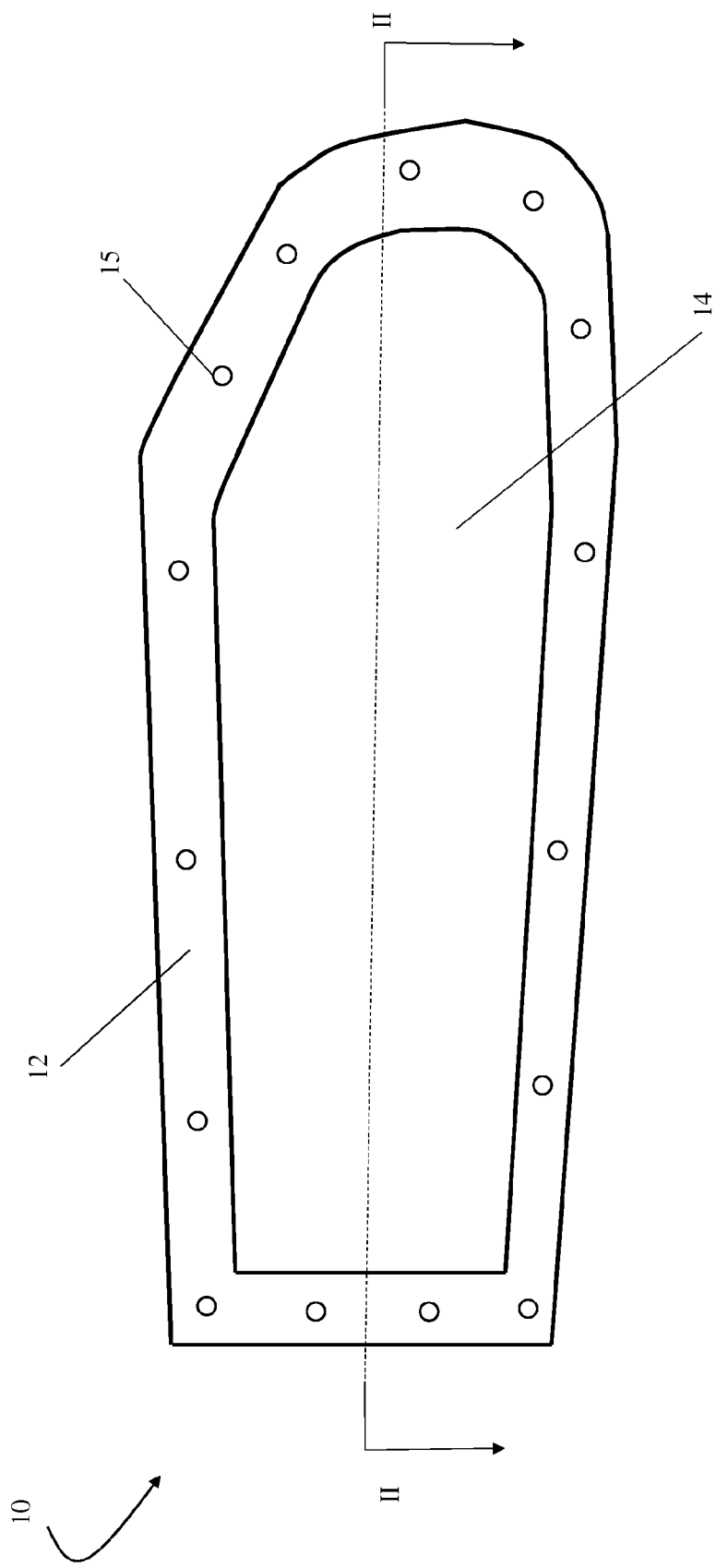
FIG. 1 is a top view of the berry catcher plate described herein, including the section line II.

FIG. 1 generally shows a top view of a berry catcher system 10 as conceived by the inventors. The berry catcher system 10 comprises an endless hollow upper rim 12 with a catcher sheet 14 stretched across the upper rim 12. In the preferred embodiment, the catcher sheet 14 is comprised of neoprene rubber, however (alternatively) the catcher sheet 14 may be comprised of any material known in the art—consistent with cushioning the blueberries so that bruising to falling blueberries is minimized.

Figure 2:
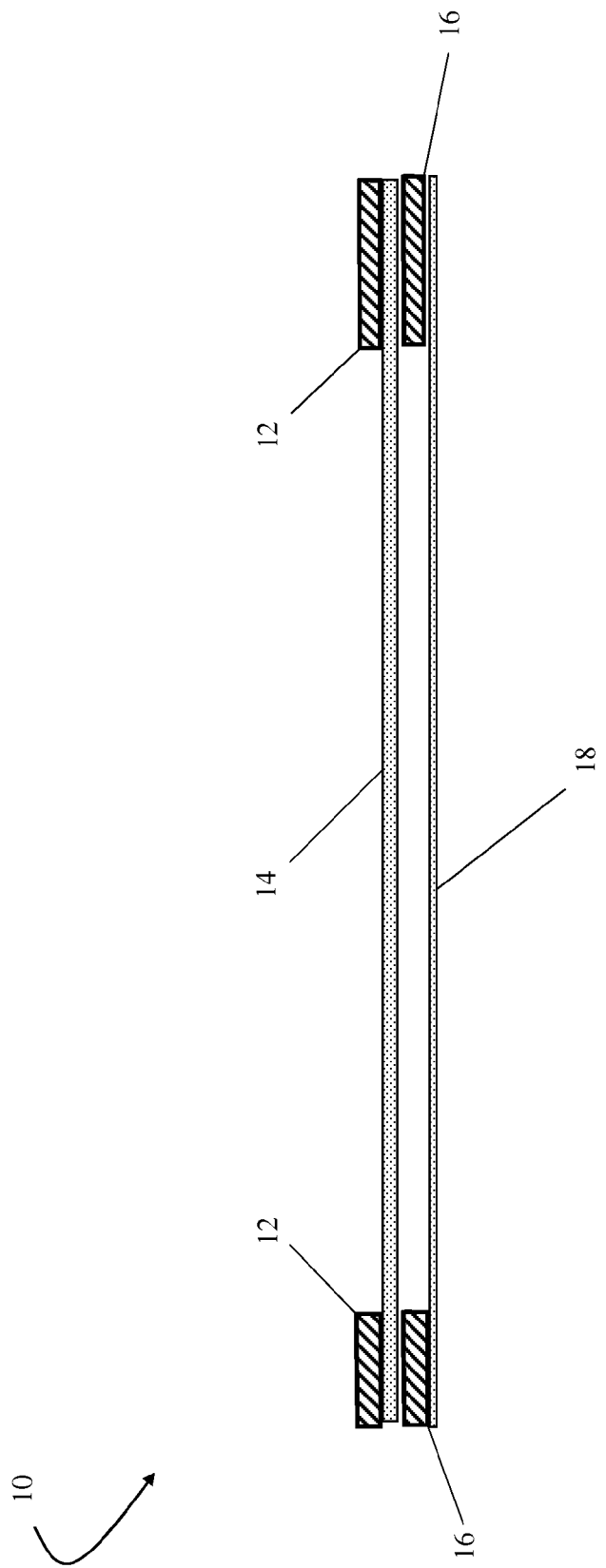
FIG. 2 is a cross-sectional profile view of the inventors' berry catcher plate, along the section line II shown in FIG. 1.

As shown in FIG. 2, the system 10 further comprises an endless hollow lower rim 16 that is essentially identical to the upper rim 14 (as shown in FIG. 1) so that the catcher sheet 14 is essentially sandwiched between the upper rim 12 and the lower rim 16.

For the purposes of this disclosure, an "endless hollow rim" means a substrate with a relatively large aperture positioned within the circumference of the substrate. For example, the upper rim 14 shown in FIG. 1 is an endless hollow rim. Other examples may include a drum rim (minus the drum head), a bicycle rim (minus the spokes) or a tennis racket head (minus the strings). Further, for the purpose of this disclosure, "elastic" does not mean a specific material or means flexible As shown in FIGS. 1 and 2, a protective sheet 18 is stretched across the lower rim 18. The protective sheet 18 provides additional support to the catcher sheet 14 so that if a large object (such as a tree limb) falls on the catcher sheet 14, the catcher sheet 14 will not be damaged. The protective sheet 18 further protects the catcher sheet 14 from tears that would otherwise be caused by stumps, branches, or other debris on the ground.

The protective sheet 18 is preferably made of a durable nylon mesh. In alternative embodiments, the protective sheet 18 may be made of any material known in the art consistent with the function of protecting the catcher sheet 14 from tears, puncture, or other potential damage caused by ground debris.

As best shown in FIG. 1, in the preferred embodiment, the components 12, 14, 16, 18 of the berry catcher system 10 are connected and held in place by rivets 15. However, in alternative embodiments, the components 12, 14, 16, 18 may be connected by adhesive, stitched cord, staples, screws, or by any other means known in the art.

In operation, the berry catcher system 10 is positioned on a harvesting platform. As berries are dislodged from their respective vines, the berries impact the catcher sheet 14, which flexes downwardly and thereby cushions the fall of the berries and minimizes bruising. As the harvester moves across the field, the protective sheet 18 provides support and protection for the catcher sheet.

For the foregoing reasons, it is clear that the method and apparatus described herein provides an innovative berry catcher system. The current system may be modified in multiple ways and applied in various technological applications. The disclosed method and apparatus may be modified and customized as required by a specific operation or application, and the individual components may be modified and defined, as required, to achieve the desired result.

Although the materials of construction are only generally described, they may include a variety of compositions consistent with the function described herein. Such variations are not to be regarded as a departure from the spirit and scope of this disclosure, and all such modifications as would be obvious to one skilled in the art are intended to be included within the scope of the following claims.

What is claimed is:

1. A berry catcher system operatively connected to a berry harvester, the system comprising:
   a hollow upper rim and a hollow lower rim;
   a catcher sheet stretched across the upper and lower rims; and
   a protector sheet stretched across the lower rim;
   wherein the berry catcher system is structured so that as the berry harvester moves across a field, falling berries dislodged by the berry harvester are caught by the catcher sheet as the protector sheet simultaneously protects the catcher sheet.

2. The system of claim 1 wherein the hollow upper and lower rims are structured so that the rims are endless.

3. The system of claim 1 wherein the catcher sheet is comprised of an elastic material.

4. The system of claim 1 wherein the catcher sheet is comprised of neoprene.

5. The system of claim 1 wherein the protector sheet is flexible and elastic.

6. The system of claim 1 wherein the catcher sheet is sandwiched between the upper and lower rims.

7. The system of claim 1 wherein the protector sheet is positioned below the lower rim.

8. The system of claim 1 wherein the upper rim and the lower rim are connected by rivets.

9. The system of claim 1 wherein the upper rim, the catcher sheet, the lower rim, and the protector sheet are connected by rivets.

10. The system of claim 1 wherein the system is structured so that the protector sheet protects the catcher sheet from debris on the ground.

11. A berry catcher system operatively connected to a harvester, the system comprising at least one endless hollow rim having an elastic catcher sheet stretched across the rim, and a protector sheet attached below the rim, wherein, as the harvester moves across a field, falling berries are dislodged by the harvester, as the berries are dislodged, the berries fall on to the catcher sheet as the protector sheet simultaneously protects an underside of the catcher sheet.

* * * * *